(12) United States Patent
Wei et al.

(10) Patent No.: US 9,580,644 B2
(45) Date of Patent: Feb. 28, 2017

(54) ADJUSTABLE ILLUMINATION DEVICES

(75) Inventors: Gongming Wei, Shanghai (CN); Yadong Liu, Shanghai (CN); Henk van Houten, Eindhoven (NL); Bo Liu, Shanghai (CN); Hugo Johan Cornelissen, Eindhoven (NL); Xiaoyan Zhu, Shanghai (CN); Cornelis Reinder Ronda, Aachen (NL); Hendrikus albertus adrianus maria de Ruijter, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 694 days.

(21) Appl. No.: 13/142,285

(22) PCT Filed: Dec. 22, 2009

(86) PCT No.: PCT/IB2009/055895
§ 371 (c)(1),
(2), (4) Date: Mar. 21, 2012

(87) PCT Pub. No.: WO2010/076739
PCT Pub. Date: Jul. 8, 2010

(65) Prior Publication Data
US 2012/0170308 A1    Jul. 5, 2012

(30) Foreign Application Priority Data

Dec. 30, 2008  (CN) .......................... 2008 1 0190300

(51) Int. Cl.
F21V 8/00      (2006.01)
C09K 11/06    (2006.01)
(Continued)

(52) U.S. Cl.
CPC ............ *C09K 11/06* (2013.01); *G02B 6/0068* (2013.01); *F21W 2131/3005* (2013.01); *F21Y 2101/00* (2013.01); *G02B 6/0035* (2013.01)

(58) Field of Classification Search
CPC .. G06F 3/04886; G06F 3/0219; G06F 3/0233; G06F 3/0237; G06F 3/0488;
(Continued)

(56) References Cited

U.S. PATENT DOCUMENTS 5,748,157 A    5/1998   Eason
5,791,966 A    8/1998   Capps et al.
(Continued)

FOREIGN PATENT DOCUMENTS

| CN | 1802598 A | 7/2006 |
|---|---|---|
| CN | 1950864 A | 4/2007 |
| CN | 101093313 A | 12/2007 |
| EP | 0254620 A1 | 1/1988 |
| EP | 1983257 A1 | 10/2008 |
| JP | 2001319514 A | 11/2001 |

(Continued)

*Primary Examiner* — Stephen F Husar
*Assistant Examiner* — Danielle Allen

(57) ABSTRACT

To improve the illumination efficiency of hand-held illumination devices, this invention proposes a new illumination device having the "rolling" function, which is capable of illuminating the target area on which a user is currently focusing and rolling the illuminated area as the user is reading forward or backward. The illumination device comprises two pluralities of lighting elements, an illuminating body and a controller. The controller can control one plurality of lighting elements to emit light to illuminate a part of the illuminating body, which can further deflect the light to a part of the surface of the target.

14 Claims, 3 Drawing Sheets

(51) Int. Cl.
*F21W 131/30* (2006.01)
*F21Y 101/00* (2016.01)

(58) Field of Classification Search
CPC ..... G09G 2330/021; G09G 2310/0235; G09G 2310/0237; G09G 3/3406; G09G 3/342; G09G 3/3607; G09G 2320/0626; G09G 2320/0686; G09G 2330/022; G09G 2354/00; G09G 3/3426; G02B 6/0011; G02B 6/0078; G02B 6/0068; G02B 6/0035; G02B 27/225; G02B 27/22; G02B 6/29358; G02B 23/2461; G02B 23/2476; G02B 6/32; G02F 1/133615; G02F 1/133603; G02F 2001/133601; G02F 1/13338; G02F 1/133621; G09F 13/02; G09F 13/04; C09K 11/06; F21W 2131/3005; F21Y 2101/02; F21Y 2101/00; G01B 9/02057; G03B 2215/0567
USPC ....... 362/612, 600, 611, 613, 630, 631, 606, 362/615, 625, 617
See application file for complete search history.

(56) References Cited

U.S. PATENT DOCUMENTS

| | | |
|---|---|---|
| 2002/0105286 A1 | 8/2002 | Brownell |
| 2003/0081407 A1 | 5/2003 | Bennett, Jr. |
| 2005/0052860 A1 | 3/2005 | Tsai |
| 2006/0279946 A1* | 12/2006 | Park et al. .................. 362/97 |
| 2007/0047261 A1* | 3/2007 | Thompson et al. .......... 362/623 |
| 2008/0094344 A1 | 4/2008 | Kuroki |
| 2008/0117341 A1 | 5/2008 | McGrew |
| 2008/0136352 A1* | 6/2008 | Paeng et al. ................ 315/294 |
| 2008/0205079 A1 | 8/2008 | Egawa et al. |
| 2008/0291695 A1* | 11/2008 | Okayasu et al. ............ 362/619 |

FOREIGN PATENT DOCUMENTS

| | | |
|---|---|---|
| JP | 2003181159 | 7/2003 |
| JP | 2004200177 | 7/2004 |
| KR | 20050029180 A | 3/2005 |
| WO | 2006059265 A1 | 6/2006 |
| WO | 2007125623 A1 | 11/2007 |
| WO | 2008087593 A2 | 7/2008 |

* cited by examiner

ADJUSTABLE ILLUMINATION DEVICES

FIELD OF THE INVENTION

The present invention relates to an illumination device for illuminating a surface, in particular to a front-light illumination device.

BACKGROUND OF THE INVENTION

In WO2008087593, an illumination device for illuminating a surface, comprising a lighting element and an illuminating body is described. The illuminating body can receive artificial light from the lighting element and deflect the received light onto the surface. The device may be placed with the illuminating body over a book or other surfaces for illuminated viewing through the transparent illuminating body. The advantage of the illumination device is that it can not only illuminate a flat surface, but also a curved surface, and that it minimizes the distortion of the images/texts on the curved surface.

However, after being powered on, the whole illuminating body, which normally is as large as a book or a magazine, is illuminated, while the user only focuses on a limited number of lines at any one moment. This decreases the illumination efficiency and reduces the time the illumination device can be operated without recharging or replacing the energy source(s). Therefore there is a need to improve the efficiency with which light is used in this kind of illumination devices.

SUMMARY OF THE INVENTION

It is an object of the invention to improve the illumination efficiency of an illumination device, in particular to illuminate only the area the user is focusing on.

According to an embodiment of the present invention, a transparent illumination device is provided. The transparent illumination device comprises a first plurality of lighting elements, a second plurality of lighting elements, an illuminating body, and a controller. The first and the second plurality of lighting elements are respectively configured to emit light, the illuminating body comprises a light extraction layer configured to receive the light emitted by the first and the second plurality of lighting elements and deflect the received light to a surface of the illumination device, and the controller is configured to control the first and the second plurality of lighting elements to emit light respectively.

By grouping multiple lighting elements into various pluralities, and controlling the various pluralities of lighting elements to emit light, especially at different times, the light from the various pluralities of lighting elements can be deflected to various sub-surfaces of the illumination device. In this way, the object of the invention can be reached.

Preferably, the illuminating body is a transparent light guide plate and the illumination device functions as a front-light illumination device, which means that the illumination device can be placed over a target and the user can read the target through the illumination device.

Optionally, in an embodiment of the present invention, the first and the second plurality of lighting elements are respectively configured to emit light of different light intensities. For example, the controller can control each lighting element to emit light such that the lit areas range from very dark to very bright. Also, the controller is further configured to respectively control the first and the second plurality of lighting elements to generate light of different light intensities. Also, the two pluralities of lighting elements can emit light of different colors.

To further divide the whole surface of the illuminating body into multiple sub-surfaces, in an embodiment, the illumination device further comprises a third plurality of lighting elements, and the controller is further configured to control the first, the second, and the third plurality of lighting elements to emit light respectively. Furthermore, in another embodiment, the three pluralities of lighting elements can be further configured to emit light of different light intensities and/or colors.

To improve the selectivity according to a user's preferences, in an embodiment, the illumination device can further comprise a selector, which is configured to select one of a plurality of operating modes of the illumination device, comprising a manual control mode and a predefined rolling mode. In the manual control mode, the controller is further configured to control each plurality of lighting elements, based on the operation by the user. In the predefined rolling mode, the controller can control each plurality of lighting elements according to a predefined profile. In other embodiments, the profile can be defined differently. For example, the profile can define the illumination duration and light intensity of each plurality of lighting elements. Furthermore, the controller can be further configured to select a predefined profile from a plurality of predefined profiles, wherein in each predefined profile the illumination duration and/or light intensity can be different.

Optionally, the illuminating body can physically comprise a plurality of illuminating sub-areas, wherein each illuminating sub-area is separate from other sub-areas and can be illuminated by a corresponding plurality of lighting elements.

In a further embodiment, the illumination device can comprise a third and a fourth plurality of lighting elements. By mixing the intensity and/or color of the light emitted by the first plurality of lighting elements with the intensity and/or color of the light emitted by the third plurality of lighting elements, and by mixing the intensity and/or color of the light emitted by the second plurality of lighting elements with the intensity and/or color of the light emitted by the fourth plurality of lighting elements, different illumination effects can be provided.

These and other aspects, features, and/or advantages of the present invention will be apparent from and elucidated with reference to the embodiments described hereinafter.

BRIEF DESCRIPTION OF THE DRAWINGS

For a more complete understanding of the present invention and the advantages thereof, the following descriptions refer to the accompanying drawings, in which.

DETAILED DESCRIPTIONS OF THE EMBODIMENTS

Figure 1:
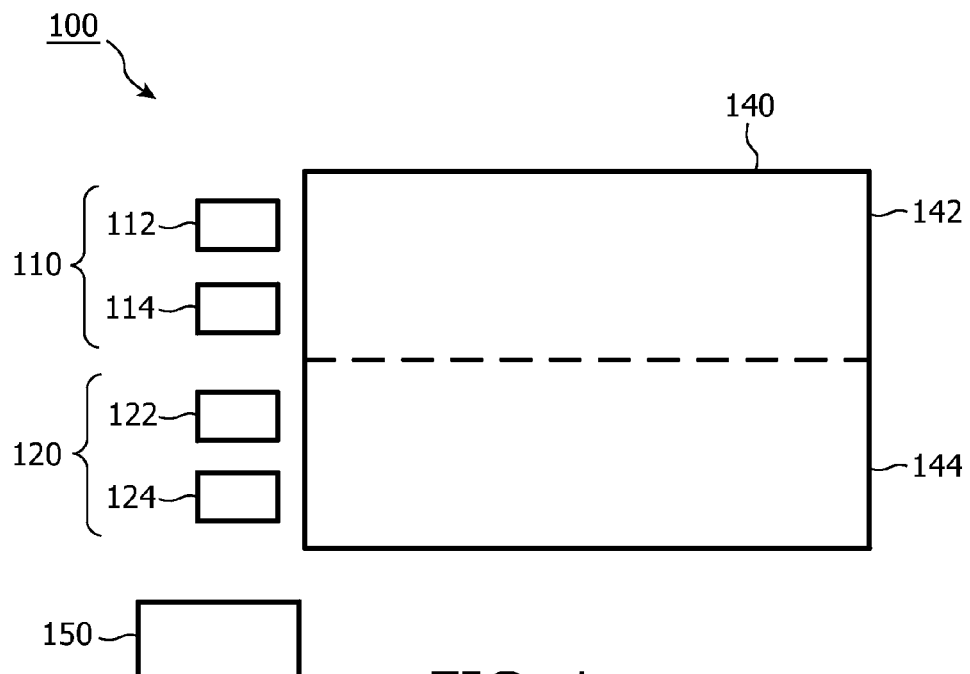
FIG. 1 illustrates an exemplary illumination device having two pluralities of lighting elements.

FIG. 1 illustrates a block diagram of an exemplary illumination device. The illumination device 100 has the first plurality of lighting elements 110, e.g. it may comprise two LEDs 112 and 114, and the second plurality of lighting elements 120, e.g. it may comprise two LEDs 122 and 124. The two pluralities of lighting elements are coupled to and can emit light into the illuminating body 140. The illumination device 100 further comprises a controller 150, which can control the first and the second plurality of lighting elements to emit light on demand. For example, at time t1 the controller 150 enables the first plurality of lighting elements 110 and, as consequence, the upper half sub-surface 142 of the illuminating body 140 is illuminated; at time t2, when the second plurality of lighting elements 120 is powered on, the lower half sub-surface 144 is illuminated. The upper half sub-surface 142 and the lower half sub-surface 144 can be illuminated alternately, forming a "rolling" effect. For example, at time t3 sub-surface 142 is illuminated and sub-surface 144 is dark; at time t4 sub-surface 142 is dark and sub-surface 144 is illuminated. The sub-surface 142 and the sub-surface 144 can be separated, but they also may overlap.

Figure 2:
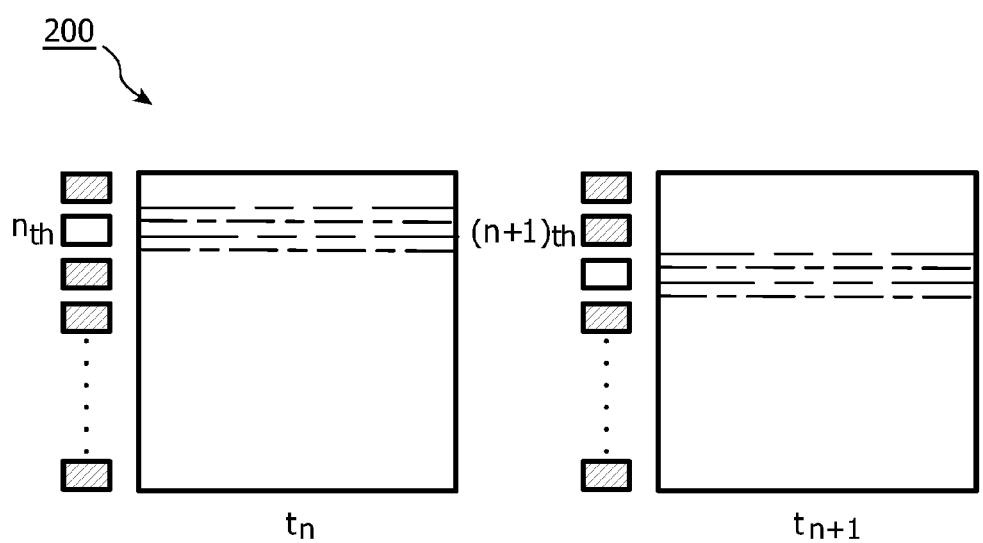
FIG. 2 illustrates the illumination effect of an exemplary illumination device having several pluralities of lighting elements.

The surface of the illuminating body 140 can be artificially divided into multiple sub-surfaces, for an optimal visual effect. This is shown in the embodiment of FIG. 2. The illumination device 200 comprises more than two pluralities of lighting elements, each plurality of lighting elements comprising only one LED. At time $t_n$ the nth LED is powered on, so the $n^{th}$ sub-surface is illuminated, and at time $t_{n+1}$ the $(n+1)^{th}$ LED is powered on, so the $(n+1)^{th}$ sub-surface is illuminated. In this way, all LEDs can be powered on and off in a rolling mode, which provides the visual effect of rolling illuminated sub-areas.

Figure 3:
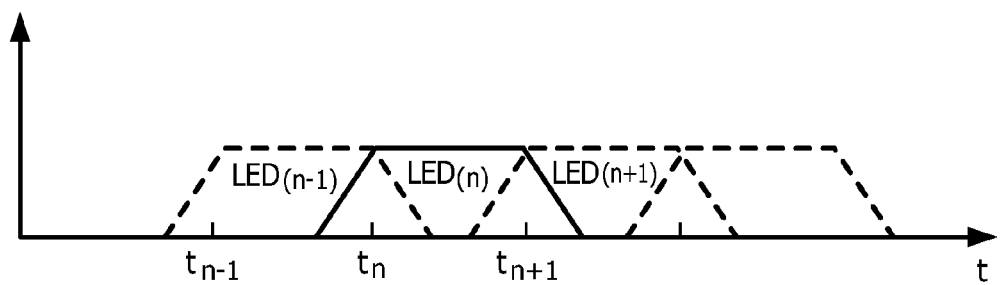
FIG. 3 illustrates an exemplary visual effect formed by rolling overlapped sub-surfaces.

In the embodiment of FIG. 2, two adjacent sub-surfaces can be absolutely separated, but they can also show overlap. FIG. 3 illustrates a visual effect that can occur when every two adjacent sub-surfaces have some overlap. This can provide the advantage of continuous and non-blinking "rolling" light.

In the embodiments of FIG. 1 and FIG. 2, all lighting elements are capable of emitting light of different light intensities and/or colors. For example, each lighting element may provide two light intensity levels: dark and bright. It may also provide three light intensity levels: dark, 50% of full brightness, and full brightness. In some embodiments, each plurality of lighting elements may comprise different lighting elements emitting light of different colors. For example, the first plurality of lighting elements may comprise a red LED, two green LEDs, and a blue LED. The controller can independently control which LED is powered on and at which light intensity level. This may provide some aesthetic effect by providing different light intensities and colors.

Figure 4:
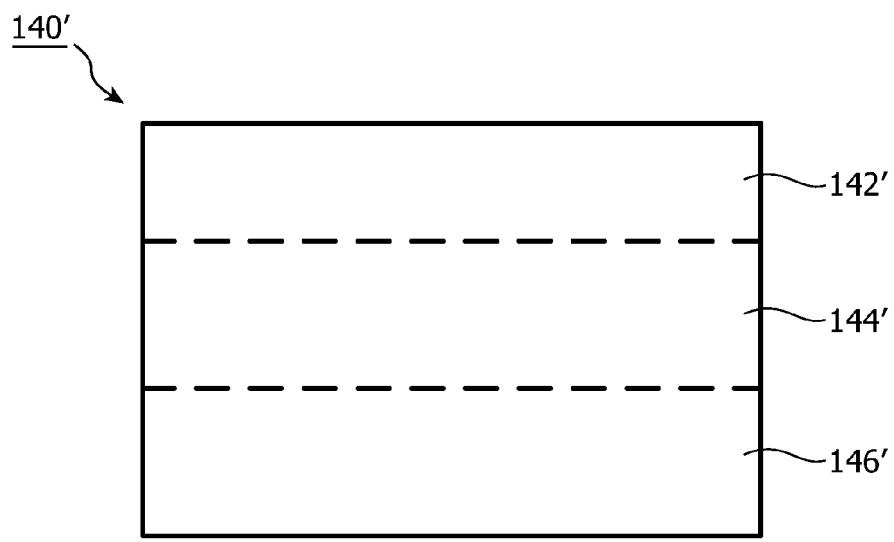
FIG. 4 illustrates an exemplary illuminating body comprising multiple sub-areas.

In the above embodiments, sub-surfaces are selected and illuminated by selecting the corresponding plurality of lighting elements under the control of the controller 150. FIG. 4 depicts another embodiment, in which the illuminating body 140' itself comprises a plurality of illuminating sub-areas 142', 144', and 146'. Each illuminating sub-area corresponds to one plurality of lighting elements, and every two adjacent illuminating sub-areas are physically separated. For example, each illuminating sub-area can be an independent light guide plate. The boundary of every two adjacent illuminating sub-areas can be visible or invisible.

Figure 5:
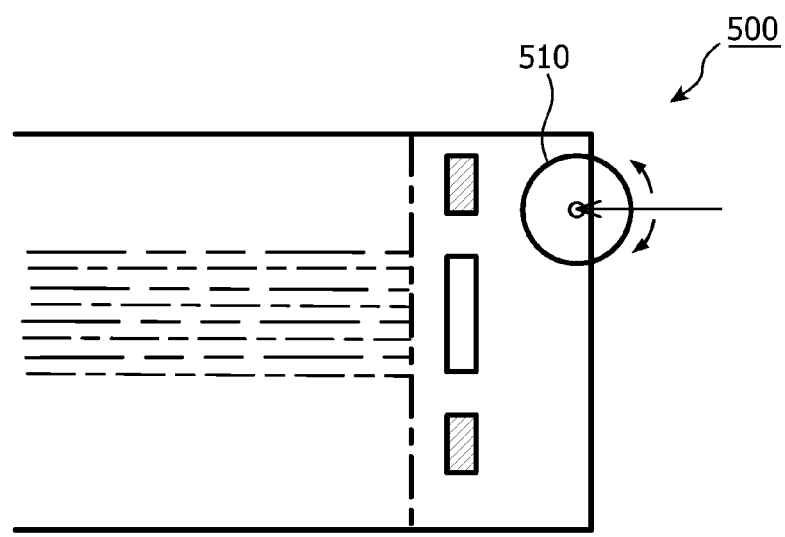
FIG. 5 illustrates an exemplary illumination device comprising a selector.

To provide better selectivity for users, FIG. 5 depicts an exemplary embodiment. The illumination device 500 comprises a selector 510, which can be located at one side of the illumination device. The selector 510 is configured to select an operating mode for the illumination device 500, being either a manual control mode or a predefined rolling mode. For example, the selector 510 can be a wheel, which can be pushed and rolled upwards and downwards. After the user has pushed the selector 510 once, the illumination device 500 starts operating in the manual control mode, in which the user can roll the wheel upwards to power on the upper plurality of lighting elements and thus illuminate the corresponding upper sub-surface, or roll the wheel downwards to power on the lower plurality of lighting elements and thus illuminate the corresponding lower sub-surface. This mode provides the users with the advantage of control on demand. After the user has pushed the selector 510 twice, the illumination device 500 starts operating in the automatic rolling mode. The rolling speed, i.e. the time during which each sub-area is illuminated, can be controlled by a predefined profile. The predefined profile can define the duration and light intensity for each plurality of lighting elements. Also, it can define the color for each lighting element.

Furthermore, the selector 510 can be configured to select a predefined profile from a plurality of predefined profiles, wherein different predefined profiles define at least different durations, light intensities, and/or colors for each plurality of lighting elements. For example, the user can push the selector 510 for 5 seconds to select a first predefined profile in which the rolling speed is low, and push the selector 510 for 10 seconds to select a second predefined profile in which the rolling speed is high.

Figure 6:
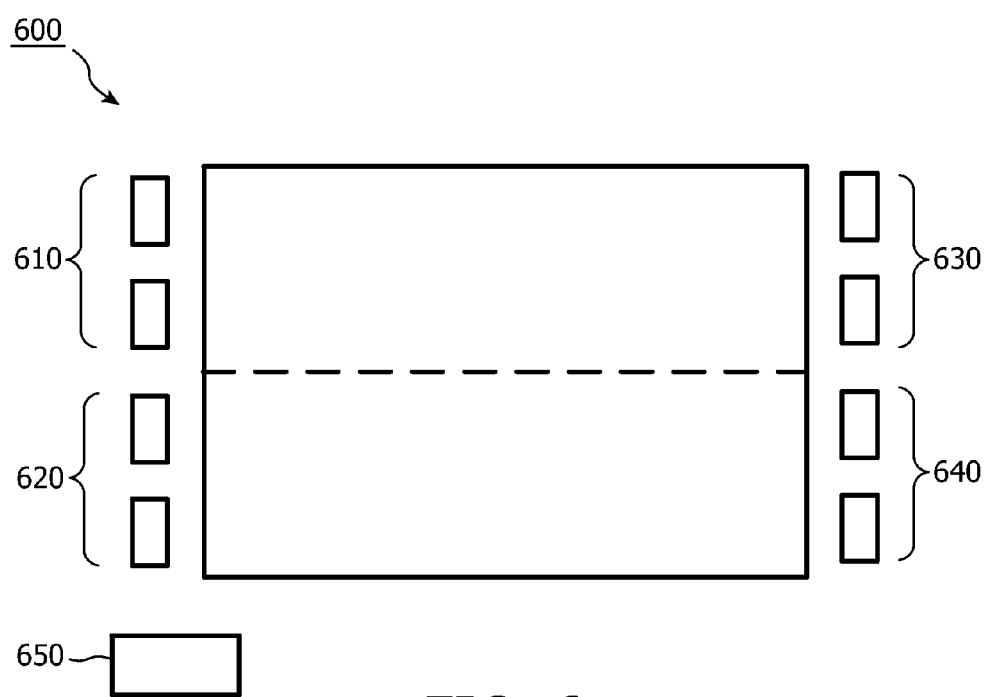
FIG. 6 illustrates an exemplary illumination device comprising four pluralities of lighting elements.

In the embodiment of FIG. 6, an illumination device 600 comprising a third and a fourth plurality of lighting elements is depicted. The third plurality of lighting elements 630 is configured to generate light with different color from the light generated by the first plurality of lighting elements 610; the fourth plurality of lighting elements 640 is configured to generate light with different color from the light generated by the second plurality of lighting elements 620. The controller 650 is further configured to respectively control the four pluralities of lighting elements. By using two pluralities of lighting elements to generate different colors for illuminating a common illuminating sub-surface, some "mixing color" effect can be provided.

The first and the third plurality of lighting elements 610 and 630 can be placed at opposite sides of the illuminating body, but they can also be interleaved at the same side of the illuminating body. In the latter scenario, one lighting element of the first plurality of lighting elements 610 is adjacent to one or two lighting elements of the third plurality of lighting elements 630. The second and the fourth plurality of lighting elements 620 and 640 can be arranged accordingly.

Those skilled in the art will appreciate that various modifications are possible in the method and apparatus thereof provided in various embodiments of the invention without departing the spirit or scope of the invention. Therefore, the scope of the invention should be construed by the appended claims.

The remarks made hereinbefore demonstrate that the detailed description with reference to the drawings, illustrate rather than limit the invention. There are numerous alternatives, which fall within the scope of the appended claims.

Any reference sign in a claim should not be construed as limiting the claim. The word "comprising" does not exclude the presence of elements or steps other than those listed in a claim. The word "a" or "an" preceding an element or step does not exclude the presence of a plurality of such elements or steps.

The invention claimed is:

1. A front-light, transparent illumination device for illuminating a surface, the device comprising:
   a first plurality of lighting elements, each lighting element being configured to emit light;
   a second plurality of lighting elements, each lighting element being configured to emit light;
   an illuminating body, comprising a light extraction layer configured to receive light emitted by the first and the second plurality of lighting elements and to deflect the received light to a surface of the illumination device to thereby illuminate an object;
   a controller, configured to control the first and the second plurality of lighting elements to emit light respectively;
   wherein the illuminating body further comprises a plurality of illuminating sub-areas, each illuminating sub-area corresponding to lighting elements selecting from the first plurality of lighting elements or from the second plurality of lighting elements; and,
   wherein the object being illuminated is observable by a user viewing the object through the illumination device.

2. An illumination device according to claim 1, wherein the illuminating body is a transparent light guide plate.

3. An illumination device according to claim 1, wherein the controller is further configured to control the first and the second plurality of lighting elements to emit light of different light intensities respectively.

4. An illumination device according to claim 1, further comprising:
   a third plurality of lighting elements, wherein the controller is further configured to control the first, the second and the third plurality of lighting elements to emit light respectively.

5. An illumination device according to claim 4, wherein the controller is further configured to control the first, the second and the third plurality of lighting elements to emit light of different light intensities or colors.

6. An illumination device according to claim 1, further comprising:
   a selector, configured to select the illumination device operating mode from a manual control mode and a predefined rolling mode, wherein in the manual control mode, the controller is manually controlled to control each plurality of lighting elements to emit light, and in the predefined rolling mode, the controller controls each plurality of lighting elements to emit light according to a predefined profile.

7. An illumination device according to claim 6, wherein the controller is further configured to control the duration and the intensity of light emitted by each plurality of lighting elements according to the predefined profile.

8. An illumination device according to claim 7, wherein the selector is further configured to select a predefined profile from a plurality of predefined profiles, wherein different predefined profiles comprise at least different lighting durations or light intensities for each plurality of lighting elements.

9. An illumination device according to claim 1, further comprising:
   a third plurality of lighting elements, configured to generate light of different color from the light generated by the first plurality of lighting elements;
   a fourth plurality of lighting elements, configured to generate light of different color from the light generated by the second plurality of lighting elements;
   wherein the controller is further configured to control the four pluralities of lighting elements to generate differently colored light.

10. An illumination device according to claim 9, wherein the third plurality of lighting elements and the first plurality of lighting elements are arranged so as to be interleaved at the same side of the illuminating body or at opposite sides of the illuminating body; and the fourth plurality of lighting elements and the second plurality of lighting elements are arranged so as to be interleaved at the same side of the illuminating body or at opposite sides of the illuminating body.

11. A hand-held, front-light transparent illumination device for illuminating a surface, the device comprising:
   a first plurality of lighting elements, each of the first plurality of lighting element being configured to emit light;
   a second plurality of lighting elements, each of the second plurality of lighting element being configured to emit light;
   an illuminating body having a light extraction layer configured to receive emitted by the first and the second plurality of lighting elements and to deflect the received light to surface of the illumination device to thereby illuminate an object;
   wherein the illuminating body is divided into a plurality of illuminating sub-areas, each illuminating sub-area corresponding to one of the plurality of first and second lighting elements;
   a controller, configured to control the first and the second plurality of lighting elements to emit light respectively; and,
   wherein the object being illuminated is observable by a user viewing the object through the illumination device.

12. A front-light, transparent illumination device for illuminating a surface, the device comprising:
   a first plurality of lighting elements, each of the first plurality of lighting element being configured to emit light;
   a second plurality of lighting elements, each of the second plurality of lighting element being configured to emit light;
   an illuminating body having a light extraction layer which receives light emitted by the first and the second plurality of lighting elements and deflects the received light to a surface of the illumination device, to thereby illuminate an object;
   wherein the illuminating body divided into a plurality of illuminating sub-areas, each illuminating sub-area corresponding to one of the plurality of first and second lighting elements;
   a controller operable to control the first and the second plurality of lighting elements to emit light; and,
   wherein the object being illuminated is observable by a user viewing the object through the illumination device.

13. An illumination device according to claim 1, wherein each of the lighting elements in the first plurality of lighting elements and in the second plurality of lighting elements is a LED device.

14. An illumination device according to claim 1, wherein each of the plurality of illuminating sub-areas is formed on the surface of the illumination device.

* * * * *